United States Patent [19]
Harmstorf

[11] Patent Number: 5,088,857
[45] Date of Patent: Feb. 18, 1992

[54] SCAVENGING APPARATUS FOR EMBEDDING CABLES OR THE LIKE INTO THE SOIL OF WATERS

[76] Inventor: Rudolf Harmstorf, Kösterbergstrasse 40F, 2000 Hamburg 55, Fed. Rep. of Germany

[21] Appl. No.: 547,653

[22] Filed: Jul. 2, 1990

[30] Foreign Application Priority Data

Jul. 7, 1989 [DE] Fed. Rep. of Germany ....... 3922349

[51] Int. Cl.⁵ ............................................. F16L 1/04
[52] U.S. Cl. ................................... 405/159; 405/158; 405/163; 37/98
[58] Field of Search .............. 405/163, 164, 182, 180, 405/174; 37/98, DIG. 18

[56] References Cited

U.S. PATENT DOCUMENTS

| | | | |
|---|---|---|---|
| 2,850,815 | 9/1958 | Edwards | 405/182 X |
| 3,338,060 | 8/1967 | Harmstorf | 405/163 |
| 3,434,297 | 3/1969 | Gretter et al. | |
| 4,498,813 | 2/1985 | Nelson et al. | 405/182 |

FOREIGN PATENT DOCUMENTS

1484692 2/1971 Fed. Rep. of Germany .
2922410 1/1980 Fed. Rep. of Germany .
2937406 3/1981 Fed. Rep. of Germany ...... 405/163

Primary Examiner—Dennis L. Taylor
Attorney, Agent, or Firm—Faegre & Benson

[57] ABSTRACT

Scavenging apparatus for embedding cables or the like into the soil of waters, comprising an elongated scavenging sword being adapted to be attached at different heights to an embedding vessel movable on the soil of waters or to a surface water vessel, the sword having a guide channel extending through the sword from the top to the bottom in the rear area thereof for the guidance of the cable and its depositing on the bottom of the trench scavenged free, the sword further including a water channel extending through from the top to the bottom in the front region thereof and connected to a pressurized water supply at the upper end and to a set of scavenging nozzles located at the front side of the scavenging sword, and a vibrator for the scavenging sword, the vibrator being connected to an energy source located on the vessels by energy supply lines, with the vibrator being located with the scavenging sword near the sole of the sword and the energy supply lines for the vibrator extend inside the sword.

6 Claims, 2 Drawing Sheets

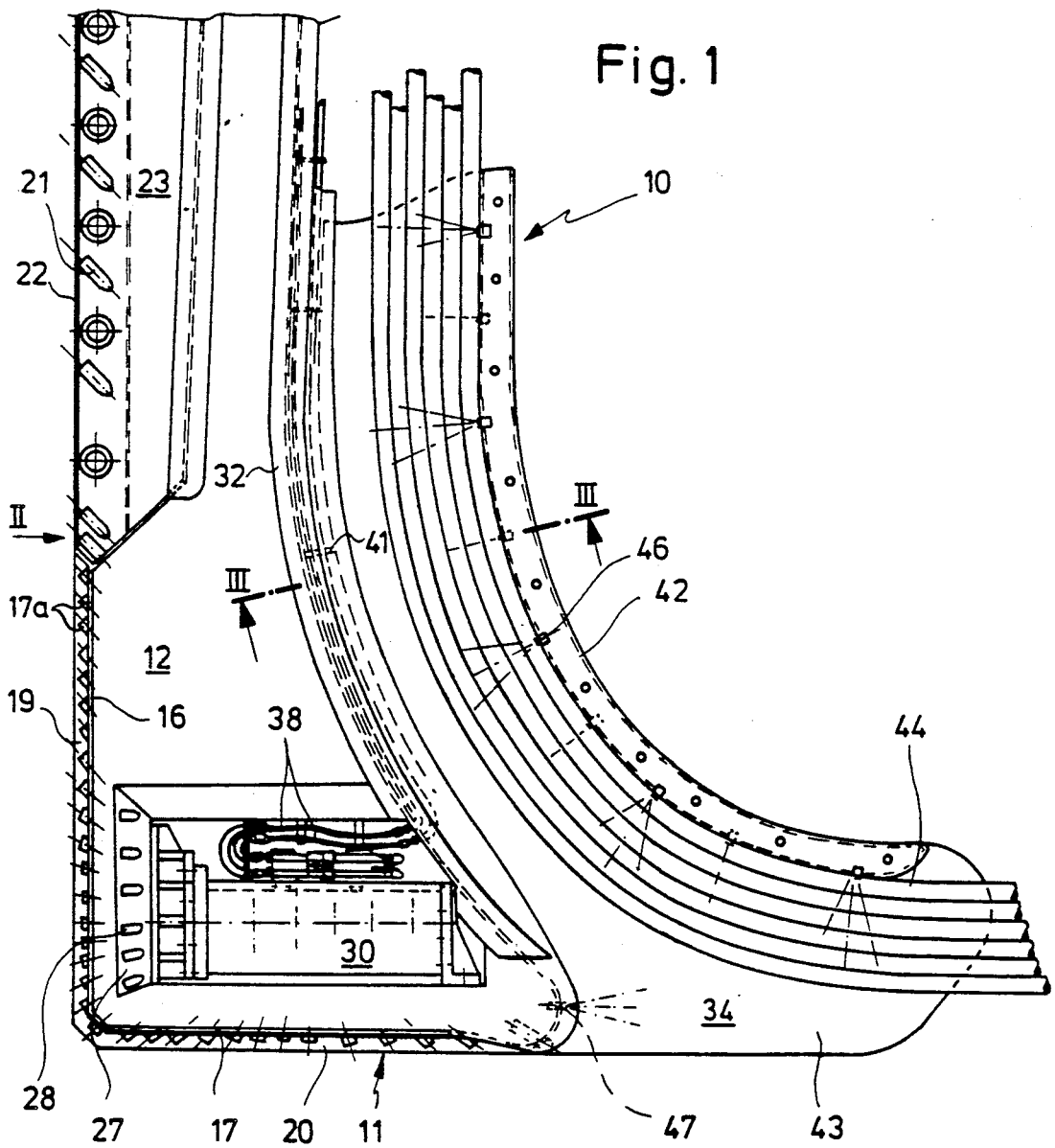

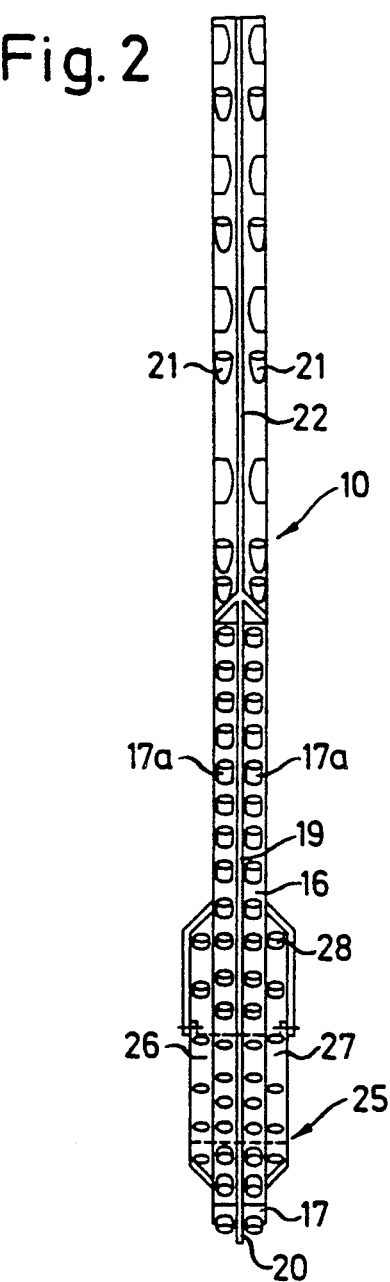
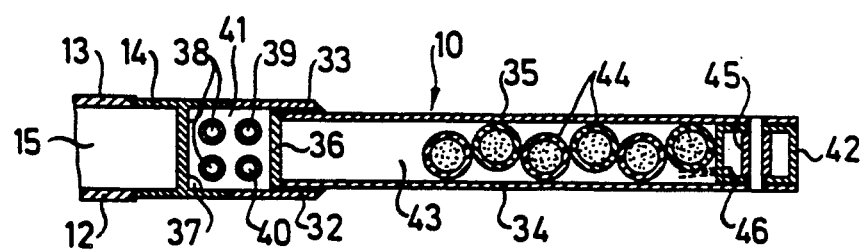

SCAVENGING APPARATUS FOR EMBEDDING CABLES OR THE LIKE INTO THE SOIL OF WATERS

BACKGROUND OF THE INVENTION

The invention relates to a scavenging apparatus for embedding cables or the like into the soil of waters.

Cables and other lines are laid for Protection reasons into the soil of waters. If the soil consists of a scavengeable formation, a slot or a trench is drawn in the soil with the assistance of a scavenging apparatus and simultaneously, the cable is laid into the trench. Such an apparatus is known for instance from the U.S. Pat. No. 3,434,297. The scavenging apparatus has a scavenging sword pivotally attached to a vessel which can be driven on the soil of waters. The scavenging sword has a guide channel for the cable and a water channel which is connected to scavenging nozzles. The scavenging nozzles are directed to the front side of the scavenging sword and scavenge free the soil area into which afterwards the cable is laid.

From DE-OS 1 484 692 it is also known to provide teeth on the front side of such a scavenging sword serving for a mechanical loosening of the soil material to be scavenged. From the above mentioned Publication and from DE-PS 29 22 410, it is also known to connect a vibrator to the scavenging sword. The vibrator puts the scavenging sword into vibration motions by which an additional mechanical loosening of the soil takes place. In the known scavenging apparatuses, the vibrator is located on the upper side of the scavenging sword. In scavenging swords attached to a surface water vessel, the upper end of the scavenging sword and hence the vibrator are above the water surface.

The object of the invention is to provide a scavenging apparatus with such a vibration arrangement that the vibration energy is efficiently converted.

This object is attached by the invention.

In the scavenging apparatus according to the invention, the vibrator is located within the scavenging sword near the sole of the sword. The energy supply lines are extended within the scavenging sword, above all due to protection reasons.

The position of the vibrator according to the invention in the rear area of the scavenging sword effects that the vibration energy is produced at a point where it is needed, that is in the region of the scavenging sword getting into contact with the underground. Further, the vibration direction can be chosen to be an optimum for the soil loosening.

Advantageously, the vibrator is hydraulically driven. The energy supply lines, for instance the hydraulic lines, extend to the lower region within the scavenging sword, advantageously in a separate channel. The vibrator itself can be waterproof encased, thus, having a sealed casing for its own. However, a necessity does not exist therefor.

The vibrator naturally has a definite switch. In an embodiment of the invention, the scavenging sword has an enlargement near the sole wherein the vibrator is placed. The enlargement, however, is uncritical, particularly if it extends only gradually to its complete width in the direction away from the front side of the scavenging sword.

The guide channel for the cable is in the rearward area of the scavenging sword (when above and in the following "in front" and "behind" is mentioned the orientation of the sides of the scavenging sword is meant resulting from the forward movement). According to an embodiment of the invention, a second water channel is located near the rear edge of the scavenging sword limiting the guide channel and connected to nozzles which are directed towards the guide channel. The nozzles spray water under pressure into the guide channel and thus facilitate the forward movement of the cable in the guide channel, above all, by reducing the friction on the guide channel wall.

The invention is explained in detail in the following along accompanied drawings.

BRIEF DESCRIPTION OF THE DRAWINGS

FIG. 1 partly is a cross section of the lower region of a scavenging sword according to the invention.

FIG. 2 is a front view of the scavenging sword according to FIG. 1.

FIG. 3 is a cross section through the scavenging sword along line 3—3.

The illustration of the scavenging sword is strongly reduced in scale, with FIG. 3 having a larger scale than FIG. 1 and 2.

DETAILED DESCRIPTION OF THE PREFERRED EMBODIMENT

The scavenging sword 10 shown in the FIGS. 1 to 3 has a L-shaped outline form in side view, with a lower cross beam representing the sole 11 being directed rearwardly in relation to the direction of movement of sword 10. A larger region of the lower portion of scavenging sword 10 is formed by parallel plates 12, 13 welded on a H-profile 14 (see FIG. 3). A water channel 15 is provided between the plates 12, 13 extending to the upper, not shown end of sword 10 and having a fitting for the supply of pressurized water. At the front, the channel is confined by a side wall 16 and downward by a bottom wall 17, two rows of scavenging nozzles 17a are located in the walls. The scavenging nozzles 17a on the side wall 16 have an axis directed obliquely upwardly and rearwardly, respectively, whereas the scavenging nozzles on the lower sole wall 17 in the left half in FIG. 1 have axes directed obliquely forwardly and downwardly and in the right part in FIG. 1, the nozzles have axes directed obliquely downwardly and rearwardly. Between the two nozzle rows, webs 19, 20 are located extending vertically to the walls 16 and 17, respectively.

Above the scavenging nozzles 17a, additional scavenging nozzles 21 are located in two rows on both sides of web 22 with axes directed obliquely upwardly. They are located in an area 23 of sword 10 which gradually tapers to web 22. However, the constructional embodiment of the scavenging sword concerning the scavenging nozzles 17a, 21 is not described further because they are known per se.

Above sole 20, the scavenging sword 10 has a case-like enlargement 25 provided by correspondingly welded-on plates. The case-like enlargement 25 tapers laterally, upwardly, downwardly and forwardly as can be seen by simultaneously looking on FIG. 1 and FIG. 2. Scavenging nozzles 28 are also located on the front walls 26 and 27, respectively, extending obliquely to the central plane of sword 10. The direction of the nozzle axes correspond to those of the axes of scavenging nozzles 17a which are located at the same height.

With the case-like enlargement 25, a hydraulically driven vibrator 30 is located. Structure and arrangement of vibrator 30 are not described in detail.

As to be seen from FIG. 3, small plates 32, 33 are welded on the back of H-profile 12. Larger plates 34, 35 also placed parallel each other are located between the plates 32, 33. They terminate rearwardly at a front wall 36. By this, a channel 37 is defined with the aid of H-profile 12, plates 32 and 33 and front wall 36 taking up four lines, that is two lines 38 for the hydraulic supply of vibrator 30, one line 39 for the leak-oil, and the fourth line 40 for de-aeration and aeration, respectively. Inside channel 37, web plates 41 are located spaced in longitudinal direction and have openings for extension and holding of lines 38 to 40.

The parallel plates 34, 35 accommodating a square pipe 42 therebetween in the rear area define a guide channel 43 for cable 44. Inside pipe 42, connectors 45 are located spaced in longitudinal direction. They serve for fixing pipe 42 between plates 34, 35. Two rows of scavenging nozzles 46 are located on the wall of pipe 42 directed towards channel 43. Pipe 42 is connected with a fitting for the supply of pressurized water can be sprayed into the guide channel 43 by means of nozzles 46.

As to be seen, the lower end of the guide channel 35 directed rearwardly is accurately curved. Channel 37 and water channel 42 are correspondingly formed. Shortly above sole 11, a nozzle 47 is connected to water channel 15, with the axis of the nozzle being directed towards the running-out part of cable 44.

In operation, the sword 10 is attached to a surface water vessel or to a vessel driving on the soil of waters. Therefore, it can be supported both at different heights and for pivotal movement and also can be urged against the soil of waters by a definite force. The necessary arrangements therefore are known per se and not demonstrated.

Upon the forward movement of sword 10, pressurized water is pressed into the channels 15 and 42 so that the soil in front of sword 10 is scavenged away by nozzles 17a and 21. Thereby, the sword can form a slot or a trench for the cables 44 guided inside guide channel 43 and afterwards laid out on the bottom of the slot or the trench. Pressurized water is also sprayed into channel 43 by the nozzles 46 whereby the cables 44 can be more easily guided in channel 43 and less friction losses occur. In order to move sword 10 forwards, the hydraulic lines 38 for the vibrator 30 are attached to the vessel onto which a suitable hydraulic source is located. The vibrator 30 produces an energy-rich vibration motion in the desired direction, i.e. in particular in the direction of the forward movement and oppositely thereto, respectively, to facilitate the scavenging of the trench or the slot.

Having thus described our invention in terms of an illustrative embodiment therefore, it is not our intention that the present invention should be considered to be limited except as defined by the following claims.

What is claimed is:

1. A scavenging apparatus for embedding cable or the like into the soil of waters, comprising an elongated scavenging sword being adapted to be attached at different heights to an embedding vessel movable on said soil of waters or to a surface water vessel, said sword having a guide channel extending through said sword from the top to the bottom in the rear area thereof for the guidance of said cable and its depositing on the bottom of said trench scavenged free, said sword further including a water channel extending through from the top to the bottom in the front region thereof and connected to a pressurized water supply at the upper end and to a first set of scavenging nozzles located at the front side of said scavenging sword, and a vibrator for said scavenging sword, said vibrator being connected by energy supply lines to an energy source located on said vessels, characterized in that said vibrator is located within an enlargement of said scavenging sword near the sole of said sword, second and third sets of nozzle are provided, with the axes of said second and third sets of nozzles directed towards said guide channel, and said energy supply lines for said vibrator extend inside said sword.

2. The scavenging apparatus of claim 1, characterized in that a channel for said energy supply lines of said vibrator is located between said guide channel and said water channel.

3. The scavenging apparatus according to claim 1, characterized in that a second water channel is located near the rear edge of said scavenging sword limiting said guide channel and connected to said second set of nozzles which are directed towards said guide channel.

4. The scavenging apparatus of claim 1, characterized in that said guide channel is limited laterally by parallel plates and rearwardly by a pipe representing said second water channel and being located between said plates.

5. The scavenging apparatus of claim 2, characterized in that the rear side of said channel for said energy supply lines is limited by the facing side of said guide channel.

6. The scavenging apparatus of claim 1, characterized in that said third set of nozzles is connected to said first water channel shortly above said sole.

* * * * *

UNITED STATES PATENT AND TRADEMARK OFFICE
CERTIFICATE OF CORRECTION

PATENT NO. : 5,088,857
DATED      : February 18, 1992
INVENTOR(S): Rudolf Harmstorf It is certified that error appears in the above-identified patent and that said Letters Patent is hereby corrected as shown below:

IN THE CLAIMS

Column 4, line 27, change "nozzle" to --nozzles--

Signed and Sealed this

First Day of June, 1993

Attest:

MICHAEL K. KIRK

*Attesting Officer*    Acting Commissioner of Patents and Trademarks